US011522726B1

(12) United States Patent
Alwar et al.

(10) Patent No.: US 11,522,726 B1
(45) Date of Patent: Dec. 6, 2022

(54) SYSTEMS AND METHODS FOR READING, STORING, AND CORRECTING HISTORICAL RECORDS IN DISTRIBUTED LEDGERS

(71) Applicant: FMR LLC, Boston, MA (US)

(72) Inventors: Vijay Alwar, Bangalore (IN); Aditya Bharadwaj B N, Bangalore (IN); Vishakha Lall, Mumbai (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/362,135

(22) Filed: Jun. 29, 2021

(51) Int. Cl.
| | |
|---|---|
| *H04L 29/06* | (2006.01) |
| *H04L 9/32* | (2006.01) |
| *H04L 67/288* | (2022.01) |
| *H04L 9/00* | (2022.01) |

(52) U.S. Cl.
CPC .......... *H04L 9/3297* (2013.01); *H04L 67/288* (2013.01); *H04L 9/50* (2022.05)

(58) Field of Classification Search
CPC .. H04L 9/3297; H04L 67/288; H04L 2209/38
See application file for complete search history.

(56) References Cited

U.S. PATENT DOCUMENTS

| | | | |
|---|---|---|---|
| 10,671,315 B2 | 6/2020 | Sanghvi | |
| 10,747,609 B1* | 8/2020 | Griffin | G06F 11/0727 |
| 10,754,989 B2 | 8/2020 | Baset et al. | |
| 2017/0163733 A1* | 6/2017 | Grefen | H04L 67/53 |
| 2017/0364552 A1* | 12/2017 | Pattanaik | G06F 16/2255 |
| 2018/0241573 A1* | 8/2018 | Ramathal | H04L 9/32 |
| 2019/0018984 A1 | 1/2019 | Setty et al. | |
| 2019/0303621 A1* | 10/2019 | Baset | G06Q 20/223 |
| 2019/0306150 A1* | 10/2019 | Letz | H04L 9/3247 |
| 2020/0245128 A1* | 7/2020 | Obaidi | H04B 1/3816 |
| 2020/0411151 A1* | 12/2020 | Puleo | G16H 20/10 |
| 2021/0036970 A1* | 2/2021 | Ivkushkin | H04L 49/9042 |
| 2021/0135854 A1* | 5/2021 | Karame | H04L 9/3247 |
| 2021/0182841 A1* | 6/2021 | Scott | G06Q 20/3678 |
| 2021/0226774 A1* | 7/2021 | Padmanabhan | H04L 9/3239 |
| 2021/0326815 A1* | 10/2021 | Brody | G06Q 20/382 |

FOREIGN PATENT DOCUMENTS

| | | | |
|---|---|---|---|
| CN | 107451011 | * | 12/2017 |
| CN | WO2018086015 | * | 5/2018 |
| CN | 111192146 B | | 7/2020 |
| KR | 20200108757 A | | 9/2020 |

* cited by examiner

*Primary Examiner* — Taghi T Arani
*Assistant Examiner* — Lin Chang
(74) *Attorney, Agent, or Firm* — Cesari & McKenna, LLP (57) ABSTRACT

Systems and methods for implementing historical data correction on a blockchain network. The method includes receiving historical data corresponding to a timestamp. The method also includes determining a first data block at a first address in a blockchain associated with the timestamp. The method further includes identifying a second address stored in the first data block corresponding to a second data block at the second address in the blockchain. The method also includes storing the historical data and the second address corresponding to the second data block in a third block at a third address in the blockchain. The method further includes calculating corrected metrics based on at least the historical data stored in the third data block. The method also includes generating a notification including an indication associated with the calculated corrected metrics.

18 Claims, 8 Drawing Sheets

SYSTEMS AND METHODS FOR READING, STORING, AND CORRECTING HISTORICAL RECORDS IN DISTRIBUTED LEDGERS

FIELD OF THE INVENTION

The present invention relates generally to systems and methods for reading and storing data in distributed ledgers, including systems and methods for correcting data stored in distributed ledgers.

BACKGROUND OF THE INVENTION

A digital distributed ledger or blockchain is a database that is a consensus of replicated, shared, and synchronized digital data having no central administrator and geographically ubiquitous. Reading records in a distributed ledger currently requires keeping track of the block numbers where specific records are stored. This is currently achieved by maintaining an off-chain component or hash table that is updated with the block numbers associated with specific records. Furthermore, correction of historical records is difficult given the inherent immutability of the blockchain implementation.

SUMMARY OF THE INVENTION

Accordingly, an object of the invention is to provide systems and methods for reading historical records in distributed ledgers. For example, it is an object of the invention to provide systems and methods for sequentially reading historical data on a blockchain network. It is an object of the invention to provide systems and methods for storing historical records in distributed ledgers. For example, it is an object of the invention to provide systems and methods for storing historical data on a blockchain network. It is an object of the invention to provide systems and methods for correcting historical records in distributed ledgers. For example, it is an object of the invention to provide systems and methods for implementing historical data correction on a blockchain network. It is an object of the invention to provide systems and methods for calculating corrected metrics based on historical data. It is an object of the invention to provide systems and methods for generating notifications associated with calculated metrics and corrected historical data.

In some aspects, a computerized method for sequentially reading historical data on a blockchain network includes receiving a timestamp corresponding to historical data. The method further includes determining a first data block at a first address in a blockchain, the first data block associated with the timestamp. The method also includes identifying a second address stored in the first data block corresponding to a second data block at the second address in the blockchain. Further, the method includes identifying a third address stored in the second data block corresponding to a third data block at the third address in the blockchain. The method also includes receiving the historical data from the third data block at the third address in the blockchain. The method further includes generating a notification including an indication associated with the historical data.

In some aspects, a system for sequentially reading historical data on a blockchain network includes a server computing device communicatively coupled to a user device and a database over a network. The server computing device is configured to receive a timestamp corresponding to historical data. The server computing device is also configured to determine a first data block at a first address in a blockchain, the first data block associated with the timestamp. Further, the server computing device is configured to identify a second address stored in the first data block corresponding to a second data block at the second address in the blockchain. The server computing device is also configured to identify a third address stored in the second data block corresponding to a third data block at the third address in the blockchain. Further, the server computing device is configured to receive the historical data from the third data block at the third address in the blockchain. The server computing device is also configured to generate a notification including an indication associated with the historical data.

In some aspects, a computerized method for implementing historical data correction on a blockchain network includes receiving historical data corresponding to a timestamp. The method further includes determining a first data block at a first address in a blockchain, the first data block associated with the timestamp. The method also includes identifying a second address stored in the first data block corresponding to a second data block at the second address in the blockchain. The method further includes storing the historical data and the second address corresponding to the second data block in a third data block at a third address in the blockchain. Further, the method includes calculating corrected metrics based on at least the historical data stored in the third data block. The method also includes generating a notification including an indication associated with the calculated corrected metrics.

In some embodiments, the method also includes determining a fourth data block at a fourth address in the blockchain. For example, in some embodiments, the first address is stored in the fourth data block. In some embodiments, the method also includes identifying fourth data stored in the fourth data block. For example, in some embodiments, the method also includes storing the fourth data and the third address corresponding to the third data block in a fifth data block at a fifth address in the blockchain.

In some embodiments, the method also includes determining a sixth data block at a sixth address in the blockchain. For example, in some embodiments, the fourth address is stored in the sixth data block. In some embodiments, the method also includes identifying sixth data stored in the sixth data block. For example, in some embodiments, the method also includes storing the sixth data and the fifth address corresponding to the fifth data block in a seventh data block at a seventh address in the blockchain. In some embodiments, the method also includes calculating the corrected metrics based on at least the historical data, the fourth data, and the sixth data.

In some aspects, a system for implementing historical data correction on a blockchain network includes a server computing device communicatively coupled to a database and a user device over a network. The server computing device is configured to receive historical data corresponding to a timestamp. The server computing device is also configured to determine a first data block at a first address in a blockchain, the first data block associated with the timestamp. Further, the server computing device is configured to identify a second address stored in the first data block corresponding to a second data block at the second address in the blockchain. The server computing device is also configured to store the historical data and the second address corresponding to the second data block in a third data block at a third address in the blockchain. Further, the server computing device is configured to calculate corrected metrics based on at least the historical data stored in the third data block. The server computing device is also configured to generate a notification including an indication associated with the calculated corrected metrics.

In some embodiments, the server computing device is also configured to determine a fourth data block at a fourth address in the blockchain. For example, in some embodiments, the first address is stored in the fourth data block. In some embodiments, the server computing device is also configured to identify fourth data stored in the fourth data block. For example, in some embodiments, the server computing device is also configured to store the fourth data and the third address corresponding to the third data block in a fifth data block at a fifth address in the blockchain.

In some embodiments, the server computing device is also configured to determine a sixth data block at a sixth address in the blockchain. For example, in some embodiments, the fourth address is stored in the sixth data block. In some embodiments, the server computing device is also configured to identify sixth data stored in the sixth data block. For example, in some embodiments, the server computing device is also configured to store the sixth data and the fifth address corresponding to the fifth data block in a seventh data block at a seventh address in the blockchain. In some embodiments, the server computing device is also configured to calculate the corrected metrics based on at least the historical data, the fourth data, and the sixth data.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

The systems and methods described herein can enable an application that reads, stores, and corrects historical records in distributed ledgers. For example, in some aspects, the systems and methods described herein can include one or more mechanisms or methods for sequentially reading historical data on a blockchain network. The system and methods can include mechanisms or methods for storing historical data on a blockchain network. The systems and methods described herein can provide mechanisms or methods for implementing historical data correction on a blockchain network. The systems and methods described herein can provide mechanisms or methods for calculating corrected metrics based on historical data. The systems and methods described herein can provide mechanisms or methods for generating notifications associated with the calculated metrics and the corrected historical data.

Figure 1:
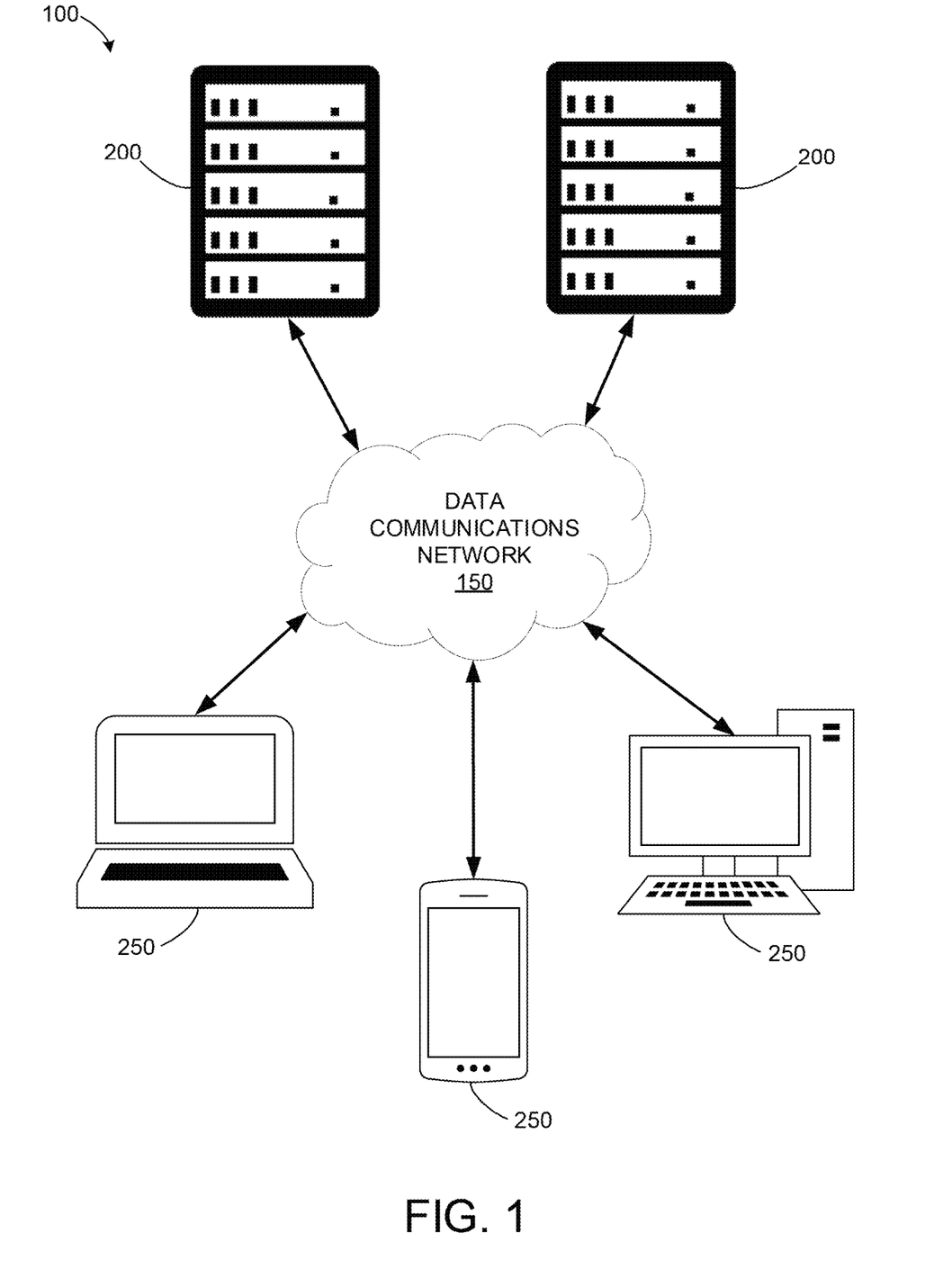
FIG. 1 is a block diagram of an exemplary data communications network, according to embodiments of the technology described herein.
Figure 2:
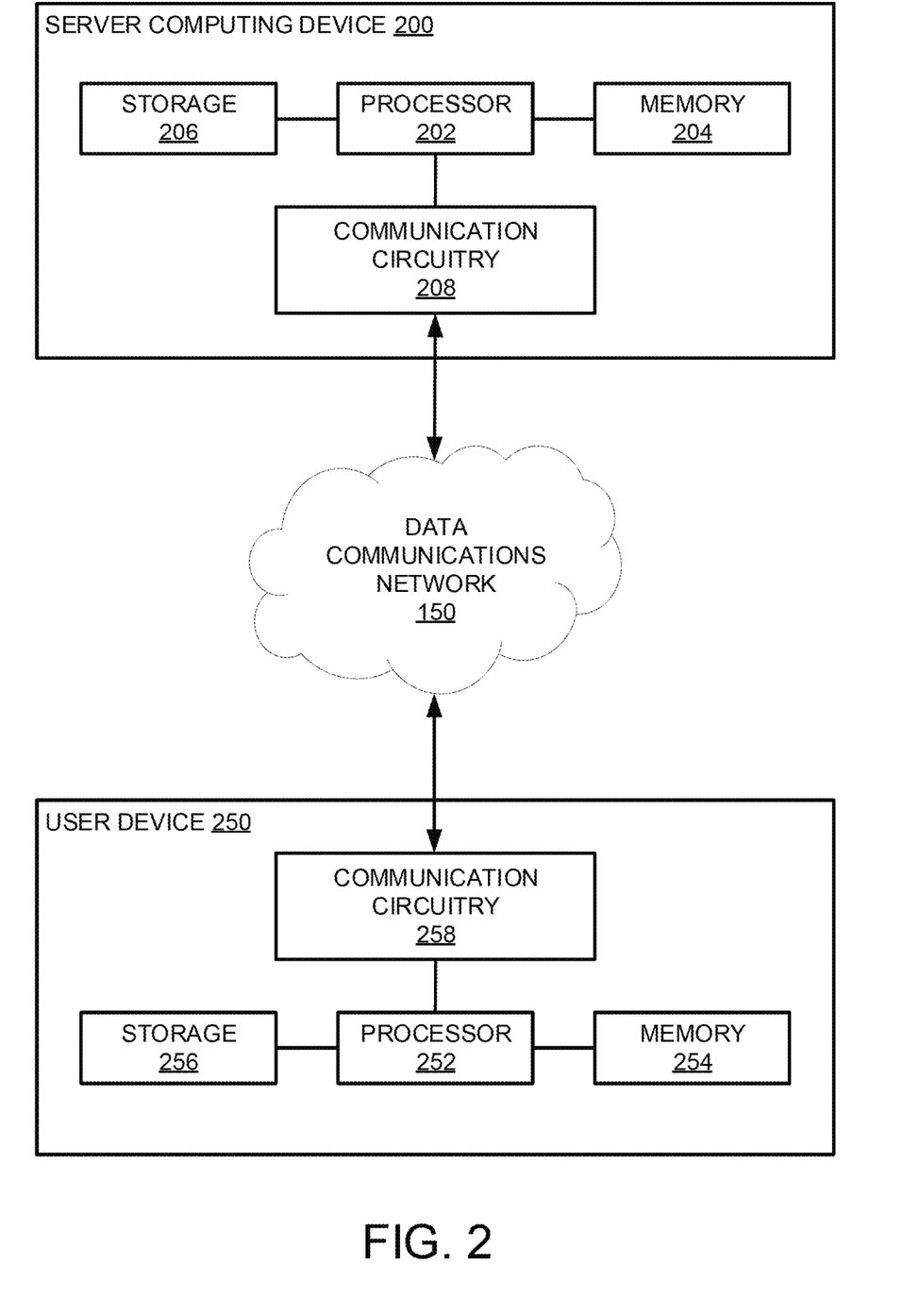
FIG. 2 is a block diagram of an exemplary server computing device and an exemplary user device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communications network 150. Communication circuitry 208 and communication circuitry 258 can use Bluetooth, Wi-Fi, or any comparable data transfer connection. The user devices 250 can include personal workstations, laptops, tablets, mobile devices, or any other comparable device.

The systems and methods described herein simplify retrieval of data from a blockchain network by constantly storing the contract address of the previous record in the sequence. The systems and methods described herein create a hierarchical structure on the blockchain network that accommodates historical data additions or changes by creating or adjusting links as required. For example, referring to FIGS. 3 and 4, a blockchain architecture 300 is illustrated. Blockchain architecture 300 includes nodes 310, blocks 320, master contract 330, recent record type 340, and application programming interface (API) 350. The elements of blockchain architecture 300 can be implemented using communications system 100.

Figure 3:
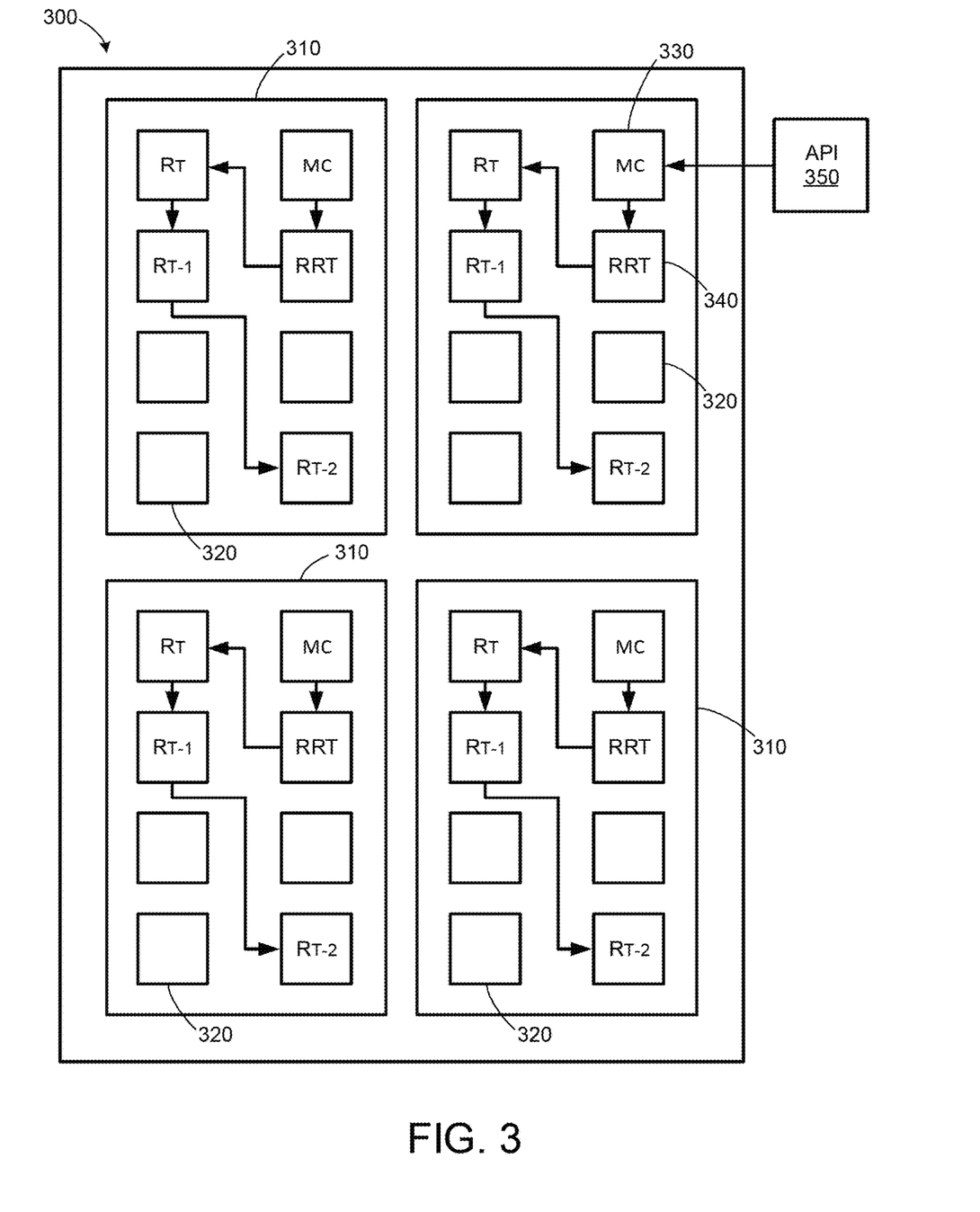
FIG. 3 is a diagram of an exemplary blockchain architecture, according to embodiments of the technology described herein.
Figure 4:
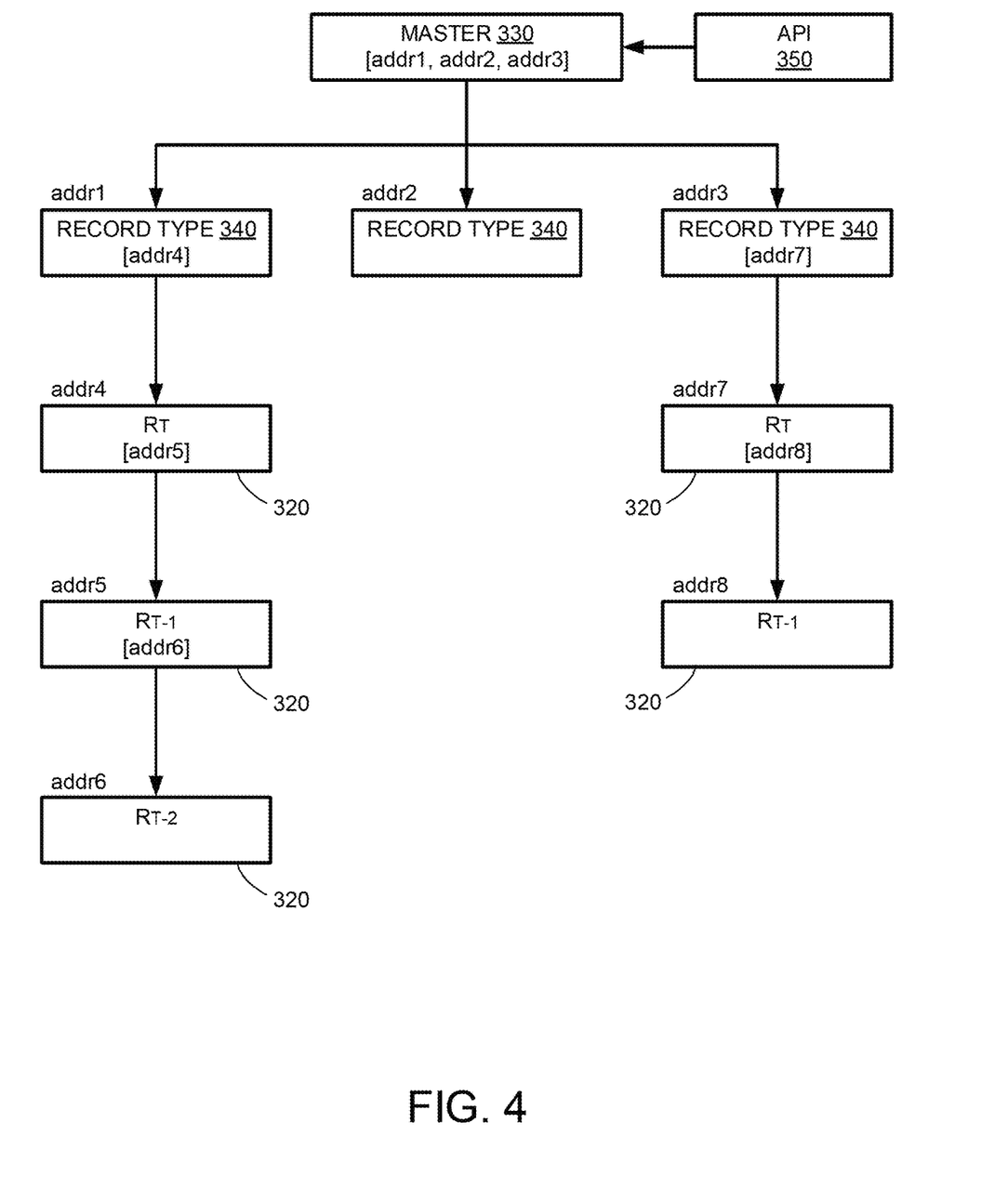
FIG. 4 is a diagram of exemplary components of the blockchain architecture shown in FIG. 3, according to embodiments of the technology described herein.

Each node 310 is a replica of the blockchain, containing copies of corresponding blocks 320. When an application wants to read a block 320 in the blockchain or write to a block 320 in the blockchain, the application interfaces with master contract 330 via API 350. Each node 310 contains a single instance of master contract 330. Master contract 330 stores the addresses of each instance of the recent record type 340 contracts in an array of addresses. Each node 310 contains several instances of recent record type 340 representing different record types. Master contract 330 is then configured to deploy and initialize the recent record type 340 based on the instructions received from API 350. Each recent record type 340 stores the address of the latest record or $R_T$ among all historical records for that record type. Recent record type 340 is then configured to deploy and initialize the $R_T$ contract. Each $R_T$ contract stores the record data corresponding to timestamp T and the address of the previous record $R_{T-1}$ in the historical sequence.

Figure 5:
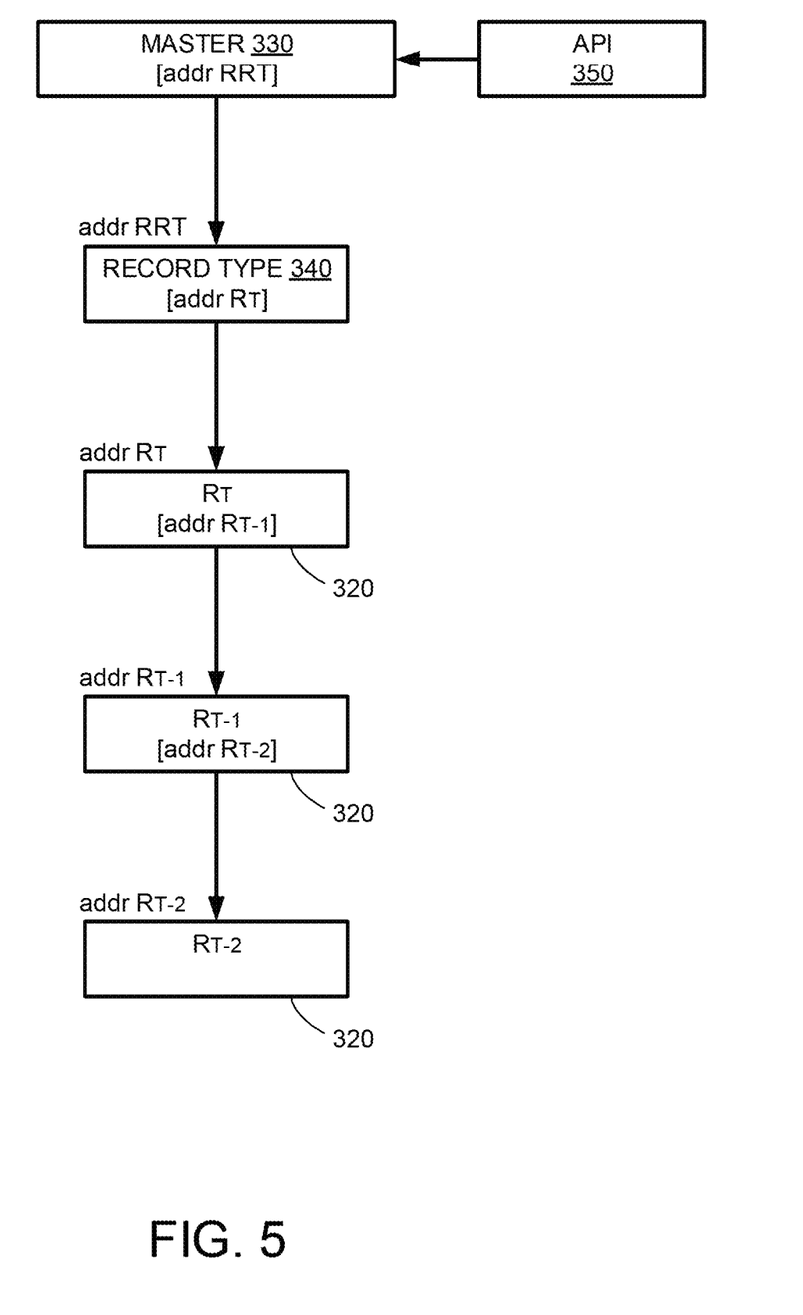
FIG. 5 is a diagram showing a visualization of sequential data retrieval using the exemplary blockchain architecture shown in FIG. 3, according to embodiments of the technology described herein.

For example, referring to FIG. 5, a visualization of sequential data retrieval using blockchain architecture 300 is illustrated. In this example, API 350 is calling for the record stored in $R_{T-2}$. Master contract 330 contains the address of recent record type 340 and points to recent record type 340 at [addr RRT]. Recent record type 340 contains the address of $R_T$ and points to $R_T$ at [addr $R_T$]. $R_T$ contains the record corresponding to recent record type 340 at timestamp T, and contains the address of $R_{T-1}$, pointing to $R_{T-1}$ at [addr $R_{T-1}$]. $R_{T-1}$ contains the record corresponding to recent record type 340 at timestamp T-1, and contains the address of $R_{T-2}$, pointing to $R_{T-2}$ at [addr $R_{T-2}$]. With this information, the record stored in $R_{T-2}$ can be read and retrieved.

Figure 6:
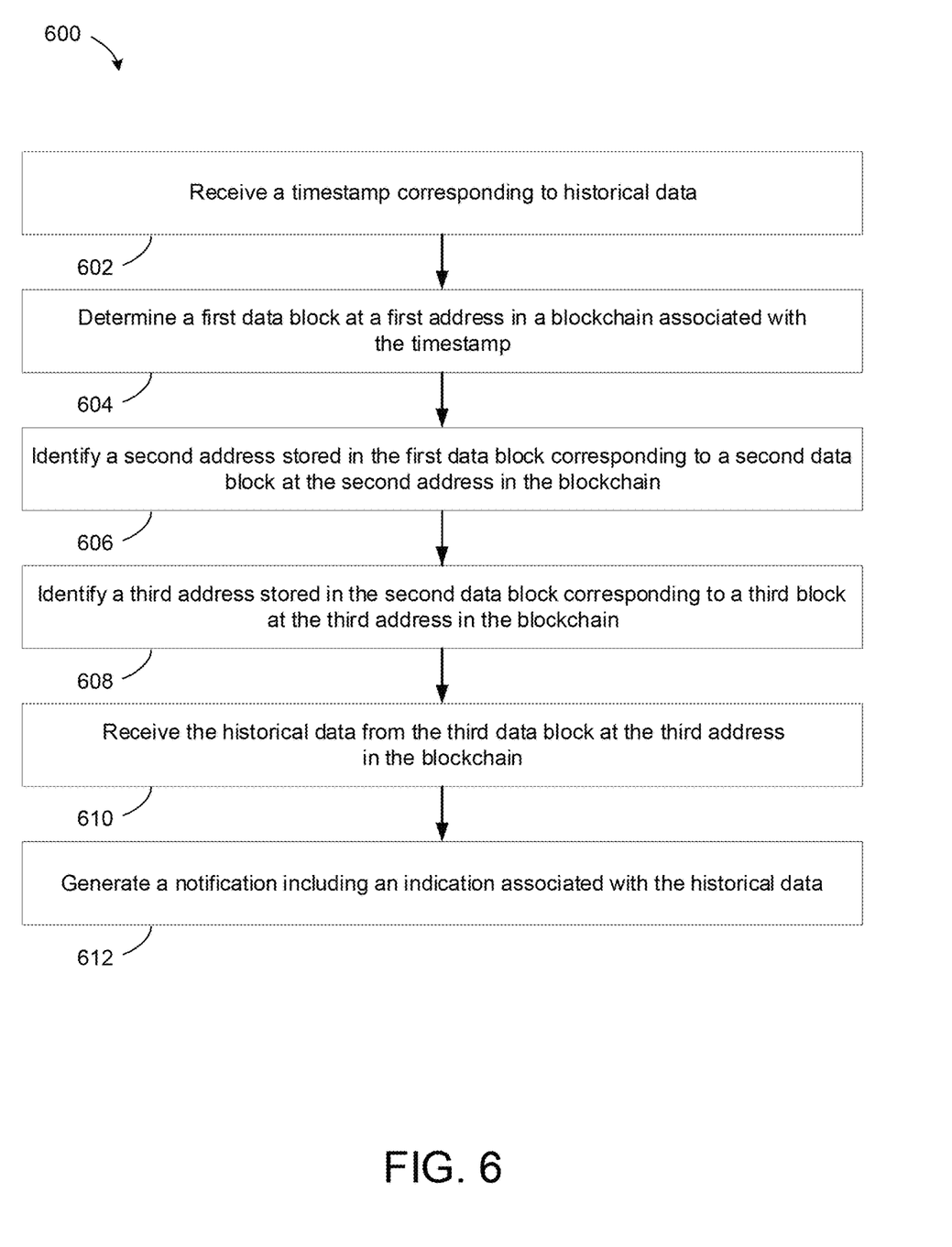
FIG. 6 is a flow diagram of a computer-implemented method for sequentially reading historical data using the exemplary blockchain architecture shown in FIG. 3, according to embodiments of the technology described herein.

For example, referring to FIG. 6, a process 600 for sequentially reading historical data on a blockchain network using communications system 100 is illustrated. Process 600 begins by receiving, by a server computing device 200, a timestamp corresponding to historical data in step 602. Process 600 continues by determining, by the server computing device 200, a first data block at a first address in a blockchain in step 604. The first data block is associated with the timestamp. Process 600 continues by identifying, by the server computing device 200, a second address stored in the first data block corresponding to a second data block at the second address in the blockchain in step 606.

Process 600 continues by identifying, by the server computing device 200, a third address stored in the second data block corresponding to a third data block at the third address in the blockchain in step 608. Process 600 continues by receiving, by the server computing device 200, the historical data from the third data block at the third address in the blockchain in step 610. Process 600 finishes by generating, by the server computing device 200, a notification including an indication associated with the historical data in step 612.

In some aspects, process 600 can be implemented on a system for sequentially reading historical data on a blockchain network. The system includes a server computing device 200 communicatively coupled to a user device 250 and a database over a network 150. The server computing device 200 is configured to receive a timestamp corresponding to historical data. The server computing device 200 is also configured to determine a first data block at a first address in a blockchain. The first data block is associated with the timestamp.

Further, the server computing device 200 is configured to identify a second address stored in the first data block corresponding to a second data block at the second address in the blockchain. The server computing device 200 is also configured to identify a third address stored in the second data block corresponding to a third data block at the third address in the blockchain. Further, the server computing device 200 is configured to receive the historical data from the third data block at the third address in the blockchain. The server computing device 200 is also configured to generate a notification including an indication associated with the historical data.

The systems and methods described herein allow for simple traversal through records stored in a blockchain. Record are stored in different blocks 320 but are linked together to form a systematic historical sequence. The systems and methods described herein also allow for correction of historical records. For example, referring to FIG. 7, a visualization of historical data correction using the blockchain architecture 300 illustrated. In this example, a record stored at $R_{T-2}$ has changed or needs correction. Blockchain architecture 300 is configured to create new blocks 320 to update the changed record but also update the chain.

Figure 7:
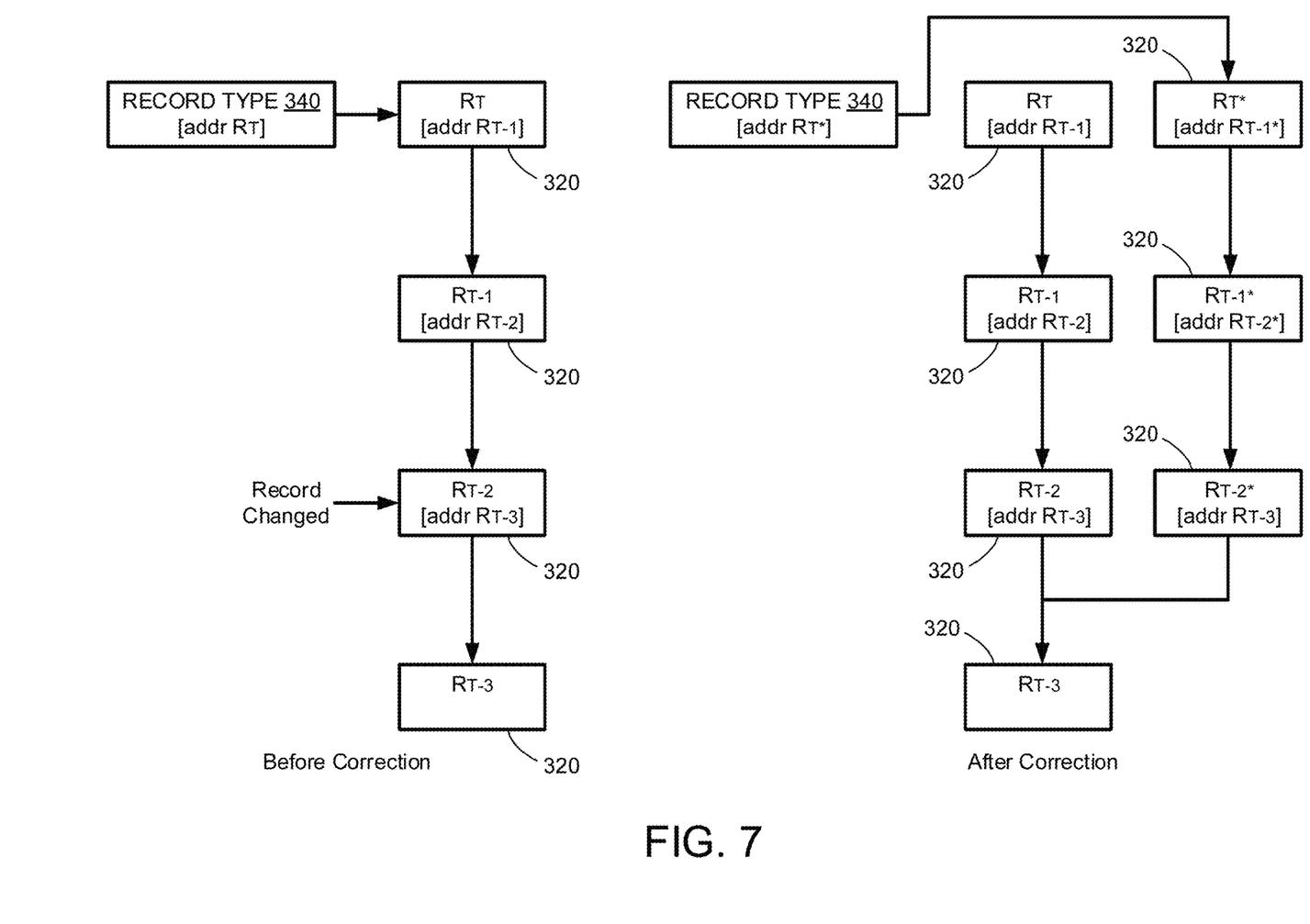
FIG. 7 is a diagram showing a visualization of historical data correction using the exemplary blockchain architecture shown in FIG. 3, according to embodiments of the technology described herein.

For example, new block $R_{T-2*}$ is written to the chain with the updated or corrected record corresponding to timestamp T-2. Block $R_{T-2*}$ is also stored with the address of the next block in the sequence, $R_{T-3}$. New block $R_{T-1*}$ is written to the chain with a copy of the record stored at block $R_{T-1}$ and the address of the next block in the sequence, $R_{T-2*}$. New block $R_{T*}$ is written to the chain with a copy of the record stored at block $R_T$ and the address of the next block in the sequence, $R_{T-1*}$. Recent record type 340 is then updated with the new address of the most recent record [addr $R_{T*}$]. Stale records exist on the chain ($R_T$, $R_{T-1}$, and $R_{T-2}$) but the links are updated so that the stale records are not included in the sequence.

Figure 8:
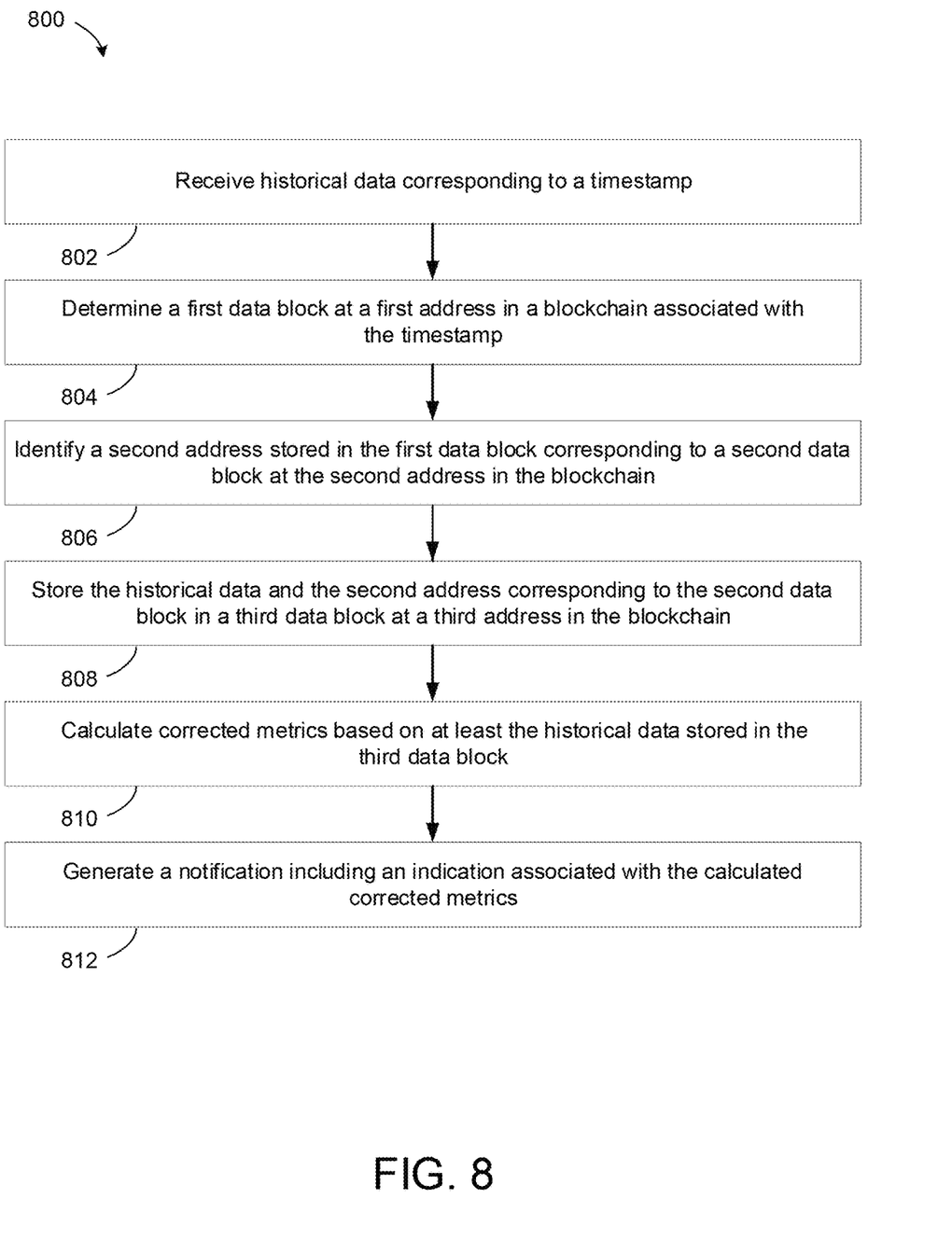
FIG. 8 is a flow diagram of a computer-implemented method for implementing historical data correction using the exemplary blockchain architecture shown in FIG. 3, according to embodiments of the technology described herein.

For example, referring to FIG. 8, a process 800 for implementing historical data correction on a blockchain network using communications system 100 is illustrated. Process 800 begins by receiving, by a server computing device 200, historical data corresponding to a timestamp in step 802. Process 800 continues by determining, by the server computing device 200, a first data block at a first address in a blockchain in step 804. The first data block is associated with the timestamp.

Process 800 continues by identifying, by the server computing device 200, a second address stored in the first data block corresponding to a second data block at the second address in the blockchain in step 806. Process 800 continues by storing, by the server computing device 200, the historical data and the second address corresponding to the second data block in a third data block at a third address in the blockchain in step 808. Process 800 continues by calculating, by the server computing device 200, corrected metrics based on at least the historical data stored in the third data block in step 810. Process 800 finishes by generating, by the server computing device 200, a notification including an indication associated with the calculated corrected metrics in step 812.

In some embodiments, process 800 also includes determining a fourth data block at a fourth address in the blockchain. For example, in some embodiments, the first address is stored in the fourth data block. In some embodiments, process 800 also includes identifying fourth data stored in the fourth data block. For example, in some embodiments, process 800 also includes storing the fourth data and the third address corresponding to the third data block in a fifth data block at a fifth address in the blockchain.

In some embodiments, process 800 also includes determining a sixth data block at a sixth address in the blockchain. For example, in some embodiments, the fourth address is stored in the sixth data block. In some embodiments, process 800 also includes identifying sixth data stored in the sixth data block. For example, in some embodiments, process 800 also includes storing the sixth data and the fifth address corresponding to the fifth data block in a seventh data block at a seventh address in the blockchain. In some embodiments, process 800 also includes calculating the corrected metrics based on at least the historical data, the fourth data, and the sixth data.

In some aspects, process 800 can be implemented on a system for implementing historical data correction on a blockchain network. The system includes a server computing device 200 communicatively coupled to a user device 250 and a database over a network 150. The server computing device 200 is configured to receive historical data corresponding to a timestamp. The server computing device 200 is also configured to determine a first data block at a first address in a blockchain, the first data block associated with the timestamp.

Further, the server computing device 200 is configured to identify a second address stored in the first data block corresponding to a second data block at the second address in the blockchain. The server computing device 200 is also configured to store the historical data and the second address corresponding to the second data block in a third data block at a third address in the blockchain. Further, the server computing device 200 is configured to calculate corrected metrics based on at least the historical data stored in the third data block. The server computing device 200 is also configured to generate a notification including an indication associated with the calculated corrected metrics.

In some embodiments, the server computing device 200 is also configured to determine a fourth data block at a fourth address in the blockchain. For example, in some embodiments, the first address is stored in the fourth data block. In some embodiments, the server computing device 200 is also configured to identify fourth data stored in the fourth data block. For example, in some embodiments, the server computing device 200 is also configured to store the fourth data and the third address corresponding to the third data block in a fifth data block at a fifth address in the blockchain.

In some embodiments, the server computing device 200 is also configured to determine a sixth data block at a sixth address in the blockchain. For example, in some embodiments, the fourth address is stored in the sixth data block. In some embodiments, the server computing device 200 is also configured to identify sixth data stored in the sixth data block. For example, in some embodiments, the server computing device 200 is also configured to store the sixth data and the fifth address corresponding to the fifth data block in a seventh data block at a seventh address in the blockchain. In some embodiments, the server computing device 200 is also configured to calculate the corrected metrics based on at least the historical data, the fourth data, and the sixth data.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A computerized method for implementing historical data correction on a blockchain, the method comprising:
    identifying, by a server computing device, historical data on a blockchain that requires correction, including identifying a historical address and a historical timestamp associated with the historical data;
    determining, by the server computing device, a first data block of a plurality of data blocks in the blockchain using a latest address stored in a first recent record type array of a master contract in the blockchain, wherein the master contract comprises a plurality of recent record type arrays each representing a different record type;
    identifying, by the server computing device, a second address stored in the first data block corresponding to a second data block of the plurality of data blocks at the second address in the blockchain, the second data block comprising a third address for a third data block of the plurality of data blocks in the blockchain;
    determining, by the server computing device, that (i) the second address stored in the first data block of the plurality of data blocks matches the historical address and (ii) a timestamp associated with the second data block of the plurality of data blocks at the second address in the blockchain matches the historical timestamp;
    generating, by the server computing device, (i) a first new data block comprising corrected historical data and the third address corresponding to the third data block and (ii) a second new data block comprising data from the first data block and a new address;
    writing, by the server computing device, the first new data block and the second new data block to the blockchain;
    updating, by the server computing device, the first recent record type array in the blockchain to comprise the new address of the second new data block; and
    generating, by the server computing device, a notification comprising an indication associated with the corrected historical data.

2. The computerized method of claim 1, wherein the server computing device is further configured to determine a fourth data block of the plurality of data blocks at a fourth address in the blockchain.

3. The computerized method of claim 2, wherein the first address is stored in the fourth data block.

4. The computerized method of claim 3, wherein the server computing device is further configured to identify fourth data stored in the fourth data block.

5. The computerized method of claim 4, wherein the server computing device is further configured to store the fourth data and the third address corresponding to the third data block in a fifth data block of the plurality of data blocks at a fifth address in the blockchain.

6. The computerized method of claim 5, wherein the server computing device is further configured to determine a sixth data block of the plurality of data blocks at a sixth address in the blockchain.

7. The computerized method of claim 6, wherein the fourth address is stored in the sixth data block.

8. The computerized method of claim 7, wherein the server computing device is further configured to identify sixth data stored in the sixth data block.

9. The computerized method of claim 8, wherein the server computing device is further configured to store the sixth data and the fifth address corresponding to the fifth data block in a seventh data block of the plurality of data blocks at a seventh address in the blockchain.

10. A system for implementing historical data correction on a blockchain, the system comprising a server computing device communicatively coupled to a user device and a database over a network, the server computing device configured to:
- identify historical data on a blockchain that requires correction, including identifying a historical address and a historical timestamp associated with the historical data;
- determine a first data block of a plurality of data blocks in the blockchain using a latest address stored in a first recent record type array of a master contract in the blockchain, wherein the master contract comprises a plurality of recent record type arrays each representing a different record type;
- identify a second address stored in the first data block corresponding to a second data block of the plurality of data blocks at the second address in the blockchain, the second data block comprising a third address for a third data block of the plurality of data blocks in the blockchain;
- determine that (i) the second address stored in the first data block of the plurality of data blocks matches the historical address and (ii) a timestamp associated with the second data block of the plurality of data blocks at the second address in the blockchain matches the historical timestamp;
- generate (i) a first new data block comprising corrected historical data and the third address corresponding to the third data block and (ii) a second new data block comprising data from the first data block and a new address;
- write the first new data block and the second new data block to the blockchain;
- update the first recent record type array in the blockchain to comprise the new address of the second new data block; and
- generate a notification comprising an indication associated with the corrected historical data.

11. The system of claim 10, wherein the server computing device is further configured to determine a fourth data block of the plurality of data blocks at a fourth address in the blockchain.

12. The system of claim 11, wherein the first address is stored in the fourth data block.

13. The system of claim 12, wherein the server computing device is further configured to identify fourth data stored in the fourth data block.

14. The system of claim 13, wherein the server computing device is further configured to store the fourth data and the third address corresponding to the third data block in a fifth data block of the plurality of data blocks at a fifth address in the blockchain.

15. The system of claim 14, wherein the server computing device is further configured to determine a sixth data block of the plurality of data blocks at a sixth address in the blockchain.

16. The system of claim 15, wherein the fourth address is stored in the sixth data block.

17. The system of claim 16, wherein the server computing device is further configured to identify sixth data stored in the sixth data block.

18. The system of claim 17, wherein the server computing device is further configured to store the sixth data and the fifth address corresponding to the fifth data block in a seventh data block of the plurality of data blocks at a seventh address in the blockchain.

\* \* \* \* \*